(12) United States Patent
Lüchinger et al.

(10) Patent No.: US 8,294,045 B2
(45) Date of Patent: Oct. 23, 2012

(54) BALANCE WITH STABLE AIR STRATIFICATION IN THE WEIGHING COMPARTMENT

(75) Inventors: Paul Lüchinger, Uster (CH); Beat Lüdi, Wolfhausen (CH)

(73) Assignee: Mettler-Toledo AG, Greifensee (CH)

( * ) Notice: Subject to any disclaimer, the term of this patent is extended or adjusted under 35 U.S.C. 154(b) by 341 days.

(21) Appl. No.: 12/723,988

(22) Filed: Mar. 15, 2010

(65) Prior Publication Data

US 2010/0230178 A1 Sep. 16, 2010

(30) Foreign Application Priority Data

Mar. 16, 2009 (EP) ..................... 09155193

(51) Int. Cl.
*G01G 21/28* (2006.01)

(52) U.S. Cl. ...................................... 177/180

(58) Field of Classification Search .................. 177/180, 177/238
See application file for complete search history.

(56) References Cited

U.S. PATENT DOCUMENTS

| | | | | |
|---|---|---|---|---|
| 4,280,577 A * | 7/1981 | Kunz | ............................. | 177/179 |
| 4,458,288 A * | 7/1984 | Chapman et al. | ............. | 361/124 |
| 4,465,152 A | 8/1984 | Schmitter | | |
| 4,858,711 A * | 8/1989 | Kunz | ............................. | 177/212 |
| 5,430,275 A * | 7/1995 | Braunisch | ..................... | 219/708 |
| 6,515,238 B1 * | 2/2003 | Martens et al. | ............... | 177/180 |
| 6,713,690 B2 | 3/2004 | Bierich et al. | | |
| 6,951,989 B2 | 10/2005 | Nufer et al. | | |
| 7,145,086 B2 * | 12/2006 | Iiduka et al. | .................. | 177/180 |
| 7,686,507 B2 * | 3/2010 | Emery et al. | .................. | 374/166 |

FOREIGN PATENT DOCUMENTS

DE    10031415 A1    1/2002

* cited by examiner

*Primary Examiner* — Randy W Gibson

(74) *Attorney, Agent, or Firm* — Standley Law Group LLP

(57) ABSTRACT

A balance (100) has a balance housing (200), a balance pan (300), a weighing compartment (310) that contains the balance pan, a draft shield (400) with a fixed rear wall (210), the draft shield enclosing the weighing compartment, a system of balance electronics (500), a weighing cell (600) arranged below the weighing pan, and a weighing cell compartment (270) that encases the weighing cell. The weighing cell compartment is atmospherically connected by way of a hollow space (240) to the upper third of the weighing compartment. The balance electronics are arranged at the rear wall outside of the weighing compartment.

19 Claims, 3 Drawing Sheets

BALANCE WITH STABLE AIR STRATIFICATION IN THE WEIGHING COMPARTMENT

CROSS-REFERENCE TO RELATED APPLICATIONS

This application claims a right of priority under 35 USC §119 from European patent application 09 15 5193.7, filed 16 Mar. 2009, the content of which is incorporated by reference as if fully recited herein.

TECHNICAL FIELD

The present invention concerns a balance with a balance housing, a balance pan, a weighing compartment around the balance pan, a draft shield enclosing the weighing compartment, an electronic system (hereinafter referred to as "the balance electronics"), a weighing cell arranged below the weighing pan, and a weighing cell compartment which encases the weighing cell.

BACKGROUND OF THE ART

Balances of this kind are primarily used to weigh small masses. Their preferred use is in the laboratory, and stringent requirements are imposed on measurement resolution. As the masses to be weighed are small, even minor extraneous factors can lead to inaccuracies. The maximum load that can be weighed is normally in the range from three to fifty grams, while the scale division is in most cases smaller than $10^{-7}$ times the maximum load.

The measurement results of these balances can be influenced even by small extraneous factors such as for example pressure fluctuations of the ambient air. These barometric fluctuations can have the consequence that the atmospheric pressure levels in the weighing compartment and in the weighing cell compartment differ from each other. An equalization of the pressure occurs by way of a stream of air flowing through the connecting passage between the weighing pan that is arranged in the weighing compartment and the weighing cell which is arranged in the weighing cell compartment. This air current can exert an upward or downward pull on the weighing pan which leads to inaccuracies of the weighing result. As a way to avoid these errors, some state-of-the-art balances have an additional opening between the weighing cell compartment and the weighing compartment in order to allow the atmospheric pressure to be equalized between the weighing compartment and the weighing cell compartment without causing an up- or downdraft on the weighing pan.

The temperature distribution inside the balance during operation can likewise have an influence on weighing accuracy. In particular the waste heat dissipated from the balance electronics has an influence on the temperature distribution. In many balances, the weighing cell, as well as the balance electronics, is accommodated in a weighing cell compartment or lower housing part which is arranged below the weighing compartment. As a consequence of the balance electronics being arranged below the weighing compartment, the problem occurs that the heat dissipated by the balance electronics can heat up the weighing cell compartment. This happens for example in such a way that the air in the lower part of the weighing compartment is being heated through a wall between the weighing cell compartment and the weighing compartment. Due to convection, the warmer air from the lower part of the weighing compartment flows upwards, which leads to air movements in the weighing compartment. The aim is to avoid these air movements, as they cause inaccuracies of the weighing result.

A possible solution whereby these air currents can be avoided is to arrange the balance electronics outside of the lower housing part.

In several commercially available balances, such an arrangement is realized with a design where the electronic system is relocated to a separate housing outside of the balance housing. By setting up the electronics in the separate housing, a thermal separation is established, and the waste heat dissipated by the balance electronics can no longer heat up the weighing compartment. However, the separate housing requires more space, which is a disadvantage especially in laboratories where the available space is limited. In other balances, the balance electronics are arranged in a lateral housing part of the balance, whereby the warming-up of the weighing cell compartment is reduced.

In the balance that is disclosed in U.S. Pat. No. 6,713,690, to Bierich, the relocation of the balance electronics from the lower housing part is realized by combining the indicator unit and the balance electronics in a separate housing part. The arrangement of a vertical plate between this separate housing part and the balance housing ensures that the radiated heat of the balance electronics is prevented as much as possible from having an influence on the weighing compartment. For the connecting cable between the separate housing part and the balance housing, a material with low thermal conductivity is chosen, whereby the heat transfer between the separate housing part and the balance housing is further reduced. A disadvantage of this setup is its complexity and the need for additional components such as for example the vertical plate.

It has been found to be advantageous if the air temperature in the upper part of the weighing compartment is higher than in the lower part because of the stable atmospheric stratification that is present in this case, which reduces the likelihood of air movements with their negative effects on the measurement result.

In German laid-open application 100 31 415 A1, to Oldendorf, different design configurations are presented which ensure this stable stratification of the air inside the weighing compartment. In one design concept, a heater is installed in the upper part of the weighing compartment to warm the air. In a further embodiment, the lower part and the upper part of the weighing compartment are connected with a vertical tube. Attached to this tube are means for generating an upward-directed heated air flow with a small cross-sectional profile. These design concepts have the disadvantage of using additional components. Furthermore, the air stream with its narrow profile causes a strong local disturbance of the air in the weighing compartment, which can lead to errors in the measurement result.

It is an object to provide a compact balance in which a stable stratification of the air in the weighing compartment during operation can be achieved in the simplest way possible.

SUMMARY

This task is solved with the features described in the independent patent claim. Further advantageous embodiments can be found in the dependent claims.

The balance according to the invention has a balance housing, a balance pan, a weighing compartment around the balance pan, a draft shield enclosing the weighing compartment, an electronic system that is part of the balance (and is hereinafter referred to as the balance electronics), a weighing cell arranged below the weighing pan, and a weighing cell compartment which encases the weighing cell. The weighing cell compartment is atmospherically connected through a hollow space to the upper third of the weighing compartment, and the balance electronics are arranged at the rear wall outside of the weighing compartment.

This arrangement allows the pressure to equalize itself between the weighing compartment and the weighing cell compartment by way of the hollow space. By connecting the hollow space to the upper third of the weighing compartment, the possibly warmer air of the weighing cell compartment is channeled directly into the upper third of the weighing compartment. As a result, the extent of air movements inside the weighing compartment is reduced. In addition, relocating the balance electronics from the weighing cell compartment into or onto a lateral part of the housing leads to a lessening of the temperature rise in the weighing cell compartment. With this arrangement, the components generating most of the waste heat are not installed in the weighing cell compartment but in a lateral part of the housing. Thus, the weighing cell compartment cannot heat up as much, which lessens the extent to which the air in the lower part of the weighing compartment is warmed up through the wall separating the weighing cell compartment from the weighing compartment. It is not possible to remove all of the electronic components from the weighing compartment, as some of the electronic components have to be connected directly to the weighing cell. This includes for example the electromagnetic weighing coil, the A/D converter and the position sensor.

This arrangement is particularly advantageous in that it avoids on the one hand the flow of air around the balance pan and on the other hand promotes a higher temperature in the upper part of the weighing compartment. As a consequence, a stable temperature distribution is established and air movements are kept small, whereby up- and downdrafts around the weighing pan are avoided as a source of errors.

In an advantageous embodiment, a part of the draft shield is formed by a fixed rear wall, and the hollow space is arranged at the fixed rear wall. This results in a simple and compact design where the hollow space is incorporated in the balance.

As a way to reduce the temperature increase primarily in the lower part of the weighing compartment, it is advantageous to separate the lateral housing part from the weighing cell compartment with a thermal boundary. Ideally, to create this thermal boundary, the hollow space is arranged in such a way between the balance electronics and the weighing compartment that the air which is present in the hollow space can be heated by the waste heat of the balance electronics and that this heated air can deliver heat into the weighing compartment. Thus, the weighing compartment is heated through the rear wall. The warmed air in the weighing compartment is caused by thermal convection to rise along the heated rear wall into the upper part of the weighing compartment. As a result, a higher temperature establishes itself in the upper part of the weighing compartment compared to the lower part of the weighing compartment, wherein the flow velocities in this convection process are small and have only a negligible influence on the weighing pan. This effect is further enhanced if those elements of the balance electronics which generate a strong heat radiation are arranged in the upper part of the balance electronics. Furthermore, one could also add a heater in the upper part of the weighing compartment.

It is particularly advantageous if the hollow space has a wall that runs essentially parallel to the rear wall and the balance electronics are arranged at the parallel wall. Ideally, the hollow space extends over at least half of the horizontal width of the rear wall and over at least two thirds of the vertical height of the rear wall. In this way, a large contact area is made available for the heat transfer. A particularly large contact area is provided if the hollow space extends over the entire vertical height of the rear wall.

In a preferred embodiment, the hollow space is open essentially only towards the weighing cell compartment and the weighing compartment. Thus, there is in essence no air being exchanged between the hollow space and the remaining parts of the balance and the ambient atmosphere. In this way, a stable heat distribution can establish itself inside the hollow space. To ensure that an exchange of air can take place between the hollow space and the upper part of the weighing compartment, the hollow space has in its upper third at least one opening to the weighing compartment.

In an alternative embodiment, the balance has an upper housing part, and the weighing compartment is connected to the hollow space by way of this upper housing part. In this embodiment the heated air is brought from above into the weighing compartment, whereby a stable air stratification is obtained in the weighing compartment.

The balance electronics can also be arranged outside of the balance housing. Ideally, the balance electronics are arranged on the balance housing. With this arrangement, a thermal separation of the balance electronics from the weighing compartment is achieved.

A thermal isolation of the balance electronics from the weighing compartment can also be achieved by putting space holders (also referred to as spacers) between the balance electronics and the lateral housing part. Ideally, the spacers are made at least in part of a material with low thermal conductivity, such as for example a polymer.

A hollow space between the weighing cell compartment and the weighing compartment can likewise serve for the thermal isolation of the weighing cell compartment from the weighing compartment. This hollow space can be a closed space, or it can also have openings to the weighing compartment and/or to the weighing cell compartment.

A flow of ambient air between the balance electronics and the hollow space likewise serves the purpose of a thermal separation of the balance electronics from the weighing compartment.

In a particularly advantageous embodiment, the balance electronics are connected to at least one connector terminal, the latter being arranged at an angle $\alpha$ of 15° to 75° to a vertical plane of the rear wall. The connector terminal can be for example a connector socket, a connector strip, or a connector clamp.

The connector terminal can serve for the connection to an electric power supply, for the transfer of the weighing signal and/or for the connection to peripheral instruments such as for example a printer. With this arrangement, the connector terminal is easily accessible to the user and facilitates plugging and unplugging a pin connector into and out of the connector terminal. As a further advantage of the angled position of the connector, the balance can be placed closer to a wall, which is useful especially when space in a laboratory is limited.

BRIEF DESCRIPTION OF THE DRAWINGS

The balance covered by the claims appended hereto are described hereinafter through embodiments shown schematically in the drawings, wherein:

DETAILED DESCRIPTION

Figure 1:
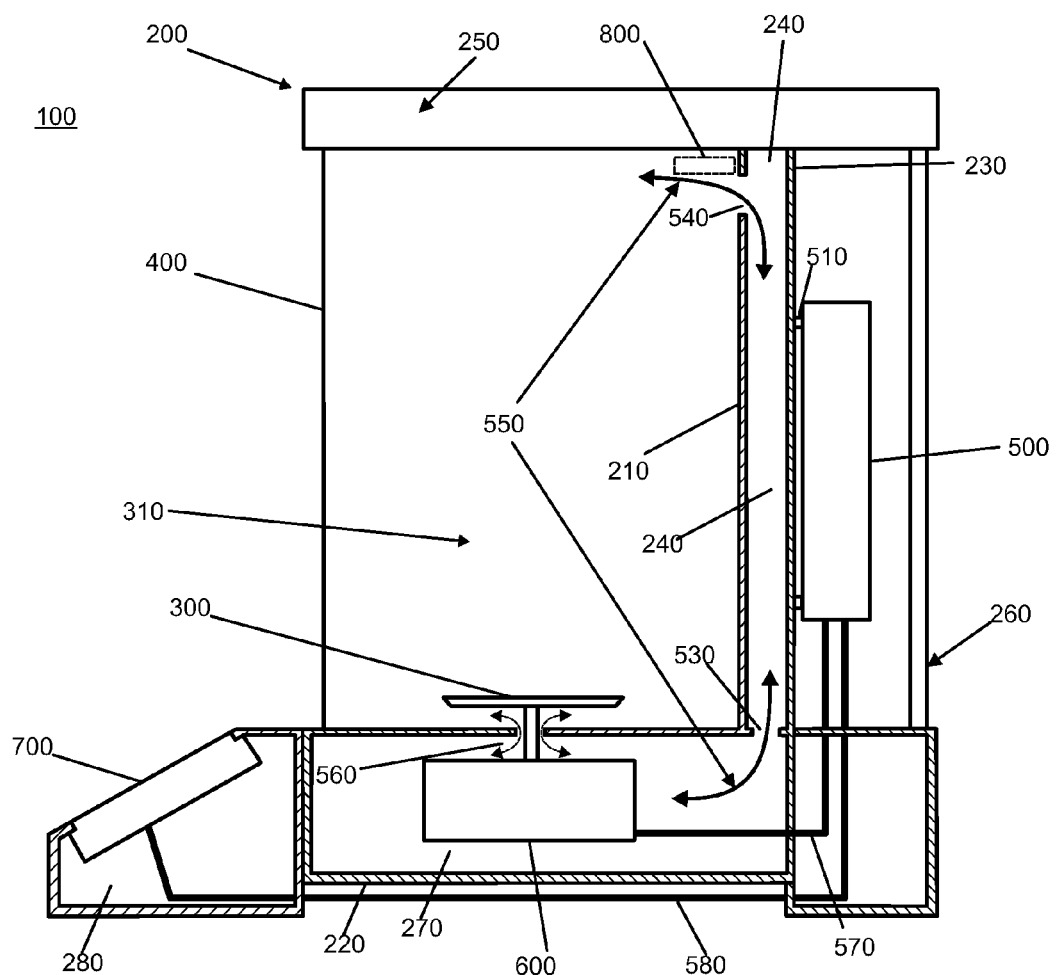
FIG. 1 represents a cross-sectional view of a first embodiment of the balance according to the invention.

FIG. 1 shows a first embodiment of the balance 100 according to the invention with a balance housing 200, a balance pan 300, a weighing compartment 310 surrounding the balance pan 300, a draft shield 400 enclosing the weighing compartment 310, a weighing cell 600 arranged below the balance pan 300, and a weighing cell compartment 270 enclosing the weighing cell 600.

The balance housing 200 has a lower housing part 220 which is arranged below the weighing compartment 310, an upper housing part 250 which is arranged above the weighing compartment 310, and a lateral housing part 260 which is arranged on a side of the weighing compartment 310. The weighing cell compartment 270 is part of the lower housing part 270.

The balance 100 has an indicating and operating unit 700 which serves for the control of the balance 100 by an operator and for the display of the measurement results. The indicating and operating unit 700 can be arranged at or in the lower housing part 220. Ideally, the indicating and operating unit 700 is arranged at or in a separate indicator housing 280. This indicator housing 280 is a part of the lower housing part 220. However, it is also possible to arrange the indicating and operating unit 700 at or in another part of the balance housing 200 or to arrange it separately from the balance housing 200.

The balance 100 includes a system of balance electronics 500 which serves to process the weighing signal of the weighing cell 600 of the balance 100. This system of balance electronics 500 is connected through a first data line 570 to the weighing cell 600 and through a second data line 580 to the indicating and operating unit 700. In one possible embodiment, a part of the second data line 580 is arranged below the lower housing part 220. However, it is possible to arrange the data lines 570, 580 in any way desired, inside and outside of the housing.

The weighing compartment 310 is enclosed by a draft shield 400. A part of the draft shield 400 is constituted by a laterally situated rear wall 210. Arranged at this rear wall 210 are the balance electronics 500. Between the rear wall 210 and the balance electronics 500, an intermediate wall 230 is arranged in such a way that a plenum or hollow space 240 is formed between the rear wall 210 and the intermediate wall 230. The intermediate wall 230 is arranged essentially parallel to the rear wall 210, and the intermediate wall 230 ideally extends over at least one half of the horizontal width of the rear wall 210. For thermal isolation, spacers 510 of a material of low thermal conductivity can be arranged between the intermediate wall 230 and the balance electronics 500.

The weighing cell compartment 270 is connected by way of the hollow space 240 to the upper area of the weighing compartment 310. As a part of this connection, there is at least one opening 530 allowing the passage of air between the weighing cell compartment 270 and the hollow space 240. Furthermore, there is also an opening allowing the passage of air between the hollow space 240 and the weighing compartment 310. It is important that the opening 530 between the weighing cell compartment 270 and the hollow space 240 as well as the opening 540 between the hollow space 240 and the weighing compartment 310 are sufficiently large. The openings 530, 540 are considered to be sufficiently large if the pressure loss through these openings 530, 540 is significantly smaller than through the connection between the balance pan 300 and the weighing cell 600. This ensures that the air will seek a preferred flow path through the openings 530, 540. An air flow movement around the balance pan 300 is thereby avoided, and consequently the up- and downdraft on the balance pan 300 is kept small. The air stream 560 flowing directly between the weighing cell compartment 270 and the weighing compartment 310 is thus smaller than the air stream 550 flowing from the weighing cell compartment 270 through the hollow space 240 into the weighing compartment 310.

Further as a result of this arrangement, the air which has been warmed by the electronic components connected to the weighing cell 600 flows from the weighing cell compartment 270 through the hollow space 240 into an upper part of the weighing compartment 310. The air picks up additional heat from the balance electronics 500 that are arranged at the hollow space 240. This results in a higher temperature in the upper part of the weighing compartment 310 than in the lower part of the weighing compartment 310. This thermal stratification is particularly stable and has a positive effect on the accuracy of the measurement result. By adding a heater 800 in the upper part of the weighing compartment 310 this effect can be further enhanced.

When referring to the upper part of the weighing compartment 310, what is meant is the top one-third of the weighing compartment 310, while the bottom one-third is referred to as the lower part of the weighing compartment 310.

The openings 530, 540 can have various different shapes. Possible shapes include for example circular or oval holes, slots or perforations. Should the opening 540 be arranged in the rear wall 210 between the weighing compartment 310 and the hollow space 240, the opening 540 could for example be realized in the form of cut-out letters which could be used as an advertising vehicle.

Arranged above the weighing compartment is an upper housing part 250. A portion of the draft shield 400 is formed by the upper housing part 250.

As will be obvious to individuals of ordinary skill in the pertinent art, it is also possible within the scope of the invention to give the hollow space 240 a different configuration in order to connect the weighing cell compartment 270 to the upper third of the weighing compartment 310.

Figure 2:
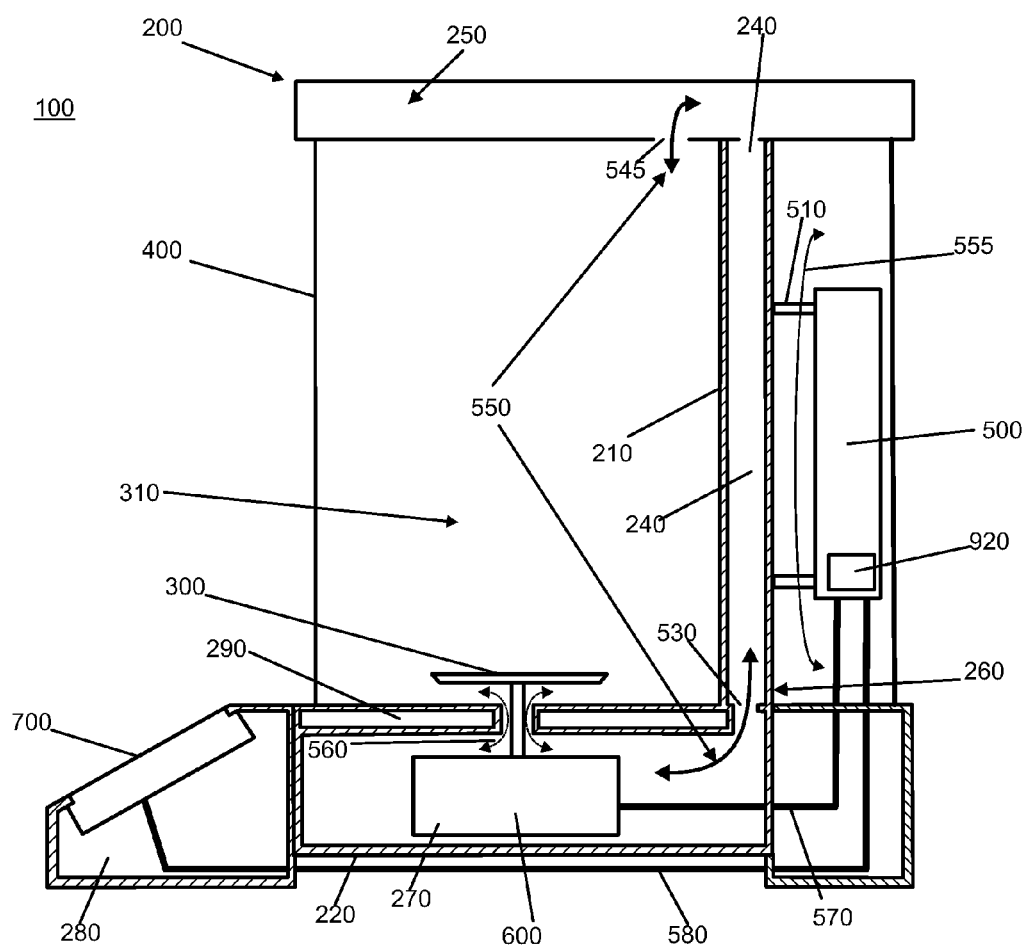
FIG. 2 represents a cross-sectional view of a second embodiment of the balance according to the invention.
Figure 3:
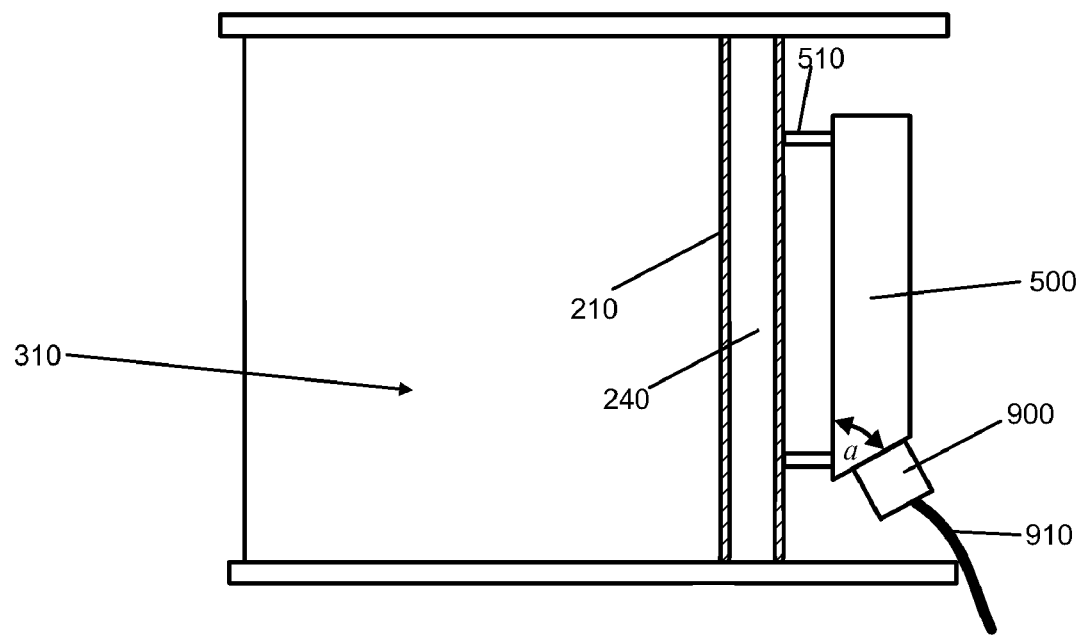
FIG. 3 represents a further cross-sectional view of the second embodiment of the balance according to the invention.

FIGS. 2 and 3 represent a second embodiment of the balance according to the invention. Components that are identical have been given the same reference symbols. The second embodiment is distinguished from the first embodiment in the way the weighing cell compartment 270 is connected to the weighing compartment 310 through the hollow space 240. This second embodiment has an upper housing part 250. The hollow space 240 has an opening leading into the upper housing part 250, and the upper housing part 250 has an opening 545 into the upper part of the weighing compartment 310.

As a further trait of this embodiment, the balance electronics 500 are arranged outside of the lateral housing part 260. In order to thermally isolate the balance electronics 500 from the weighing compartment 310, there are spacers 510 arranged between the balance electronics 500 and the lateral housing part 260. Ideally, the spacers 510 are made of a material of low thermal conductivity. A stream 555 of ambient air flowing between the balance electronics 500 and the lateral housing part 260 serves for the thermal isolation of the balance electronics 500 from the weighing compartment 310.

A hollow space 290 between the weighing cell compartment 270 and the weighing compartment 310 serves for the thermal isolation of the weighing cell compartment 270 from the weighing compartment 310. This hollow space 290 can be closed. However, it is also possible to provide the hollow space 290 with openings to the weighing compartment 310 and/or to the weighing cell compartment 270.

A connector terminal 920 serves for the connection to an electrical power supply, for the transfer of the weighing signal and/or for the connection to peripheral instruments such as for example a printer.

As is apparent from FIG. 3, the balance electronics 500 are connected to the connector terminal 920, wherein the connector terminal 920 is arranged at an angle α of 15° to 75° to the rear wall 210.

Although the invention has been described by presenting specific examples of embodiments, it is considered obvious that numerous further variant embodiments can be created from a knowledge of the present invention, for example by combining the features of the individual embodiments with each other and/or interchanging individual functional units of the embodiments described in the examples.

What is claimed is:

1. A balance, comprising:
a balance housing;
a balance pan;
a weighing compartment which contains the balance pan;
a draft shield, comprising a fixed rear wall, that encloses the weighing compartment;
a system of electronics for the balance, arranged at the fixed rear wall outside of the weighing compartment;
a weighing cell, arranged below the balance pan;
a weighing cell compartment that encases the weighing cell; and
a hollow space that atmospherically connects the weighing cell compartment to the weighing compartment through an opening located in the upper one-third of the weighing compartment.

2. The balance of claim 1, wherein:
a wall of the hollow space constitutes the fixed rear wall.

3. The balance of claim 2, wherein:
the hollow space is arranged between the balance electronics and the weighing compartment and operates to thermally separate the balance electronics from the weighing compartment.

4. The balance of claim 1, wherein:
the hollow space is arranged between the balance electronics and the weighing compartment so that waste heat generated by the balance electronics heats the air in the hollow space.

5. The balance of claim 3, wherein:
elements of the balance electronics that emit a strong heat radiation are arranged in an upper part of the balance electronics.

6. The balance of claim 2, further comprising:
a further wall of the hollow space, the further wall extending substantially in parallel to the fixed rear wall, with the balance electronics arranged thereon.

7. The balance of claim 5, wherein:
the hollow space extends over at least half of the horizontal width of the rear wall.

8. The balance of claim 5, wherein:
the hollow space extends over at least half of the vertical height of the rear wall.

9. The balance of claim 8, wherein:
the hollow space extends over the entire vertical height of the rear wall.

10. The balance of claim 1, further comprising:
an upper housing part, connecting the hollow space to the weighing compartment.

11. The balance of claim 2, further comprising:
spacers, arranged between the balance electronics and the rear wall.

12. The balance of claim 1, further comprising:
a lateral part of the balance housing, arranged relative to the balance electronics such that a stream of ambient air flows therebetween.

13. The balance of claim 1, further comprising:
a connector terminal, connected to the balance electronics, arranged relative to the rear wall at an angle in the range of 15° to 75°.

14. The balance of claim 1, wherein:
the balance electronics are arranged outside of the hollow space.

15. The balance of claim 1, wherein:
the hollow space is arranged between the balance electronics and the weighing compartment and operates to thermally separate the balance electronics from the weighing compartment.

16. The balance of claim 7, wherein:
the hollow space extends over at least half of the vertical height of the rear wall.

17. A balance, comprising:
a balance housing;
a balance pan;
a weighing compartment which contains the balance pan, in an upper portion of the balance housing;
a fixed rear wall, defining a part of a draft shield that encloses the weighing compartment;
a system of electronics for the balance, arranged at the fixed rear wall outside of the weighing compartment;
a weighing cell, arranged below the balance pan;
a weighing cell compartment that encases the weighing cell, in a lower portion of the balance housing; and
a plenum that atmospherically connects the weighing cell compartment to the weighing compartment through an opening in the upper one-third of the weighing compartment.

18. The balance of claim 17, wherein:
the plenum is arranged between the balance electronics and the weighing compartment to thermally separate the balance electronics therefrom.

19. The balance of claim 18, wherein:
the plenum extends over at least half of both the width and height of the fixed rear wall.

\* \* \* \* \*